Sept. 26, 1950
T. T. WOODSON
2,523,799
SOAP SUPPLYING SYSTEM FOR AUTOMATIC
CLOTHES-WASHING MACHINES
Filed Aug. 25, 1944
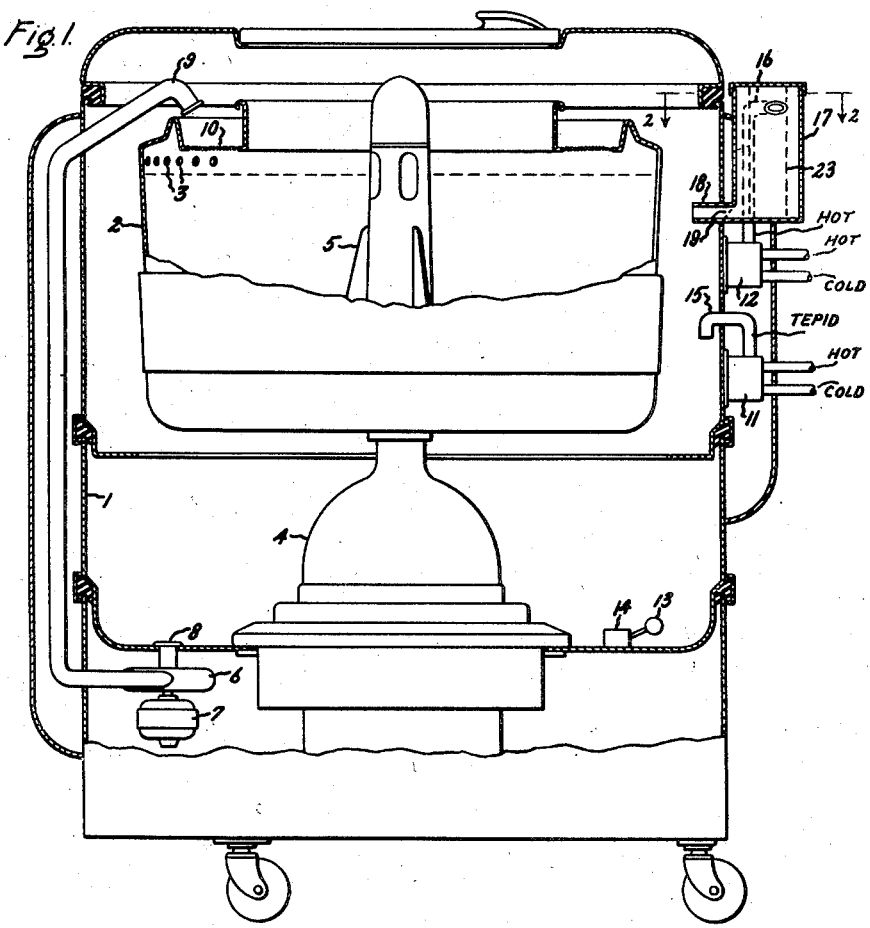
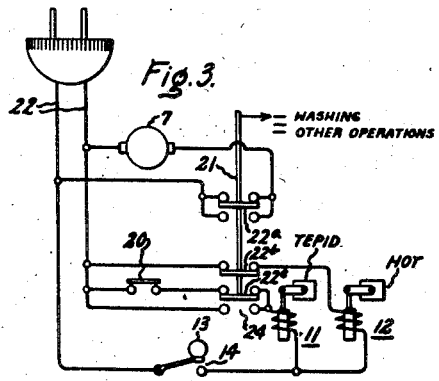
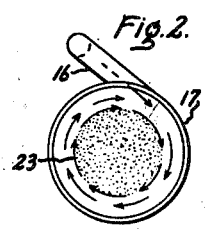
Inventor:
Thomas T. Woodson,
by Harry E. Dunham
His Attorney.

Patented Sept. 26, 1950

2,523,799

UNITED STATES PATENT OFFICE 2,523,799

SOAP SUPPLYING SYSTEM FOR AUTOMATIC CLOTHES-WASHING MACHINES

Thomas T. Woodson, Fairfield, Conn., assignor to General Electric Company, a corporation of New York Application August 25, 1944, Serial No. 551,097

4 Claims. (Cl. 68—12)

The present invention relates to the water supply system of washing machines, and is particularly concerned with the automatic supply of soap or other water conditioning compound.

The object of my invention is to provide a water supply system for washing machines, having an improved arrangement for mixing dry particles of soap or other water conditioning compound with water supplied for a washing operation. For a consideration of what I believe novel and my invention, attention is directed to the following description and the claims appended thereto.

In the accompanying drawing, Fig. 1 is a sectional elevation of a washing machine embodying my invention; Fig. 2 is a section on line 2—2 of Fig. 1; and Fig. 3 is a fragmentary control diagram.

Referring to the drawing, there is shown a washing machine of the construction disclosed in my application Serial No. 551,096, filed August 25, 1944, having a tub or outer casing 1 in the upper part of which is a spinner basket 2 having centrifugal discharge openings 3 at the region of greatest diameter which during washing serve as overflow openings defining the wash water level. By suitable mechanism in a sealed casing 4, for example that shown in my aforesaid application, an agitator 5 is oscillated for washing or the spinner basket is rotated for centrifugal drying. During washing the basket is filled to overflowing and a continuous circulation is maintained by a circulating pump 6 driven by a motor 7 and having an inlet 8 connected to the bottom of the outer casing and a discharge 9 directed onto an annular filter 10 on the rim of the spinner basket. During centrifugal drying the liquid contained in the spinner basket is discharged through the openings 3 and falls into the bottom of the outer casing where it may be stored for use in a succeeding washing operation, or pumped to a drain by a drain pump (not shown).

Water is supplied to the machine through solenoid controlled thermostatic normally closed mixing valves 11 and 12 either of which when energized is opened to supply water to the bottom of the outer casing which water is pumped into the spinner basket by the circulating pump 6 which is running whenever either of the valves is open. The amount of water supplied is controlled by a float 13 controlling a switch 14 in series with the solenoid valves. Whenever the liquid level in the outer casing is more than a predetermined small amount (e. g., 1"), the switch is opened, deenergizing the solenoid valves and interrupting the water supply. Due to the operation of the circulating pump, the accumulation of water in the bottom of the outer casing necessary to open the float switch 14 is possible only when the spinner basket is filled to overflowing or the filling valves supply water faster than the pump can lift it. In the latter case the water valves turn off and wait until the pump has caught up. This arrangement therefore insures the supply of the proper amount of water to the spinner basket for washing. If there is some residual water in the outer casing, the solenoid valves will not be energized until the circulating pump has sufficiently lowered the water level to close the float switch 14. The water supply is therefore unaffected by water from a preceding operation which may have been stored in the bottom of the outer casing.

During most of the washing operations high temperature water is unnecessary so that the valve 11 is adjusted to supply tepid water having a temperature satisfactory for the bulk of the washing operations. The water from the tepid valve 11 is discharged directly to the bottom of the outer casing through a nozzle 15. Higher temperature water for washing is obtained from the valve 12 which discharges through a tangential inlet nozzle 16 to a soap box 17 which may be loaded with dry particles of soap or other water conditioning compound. The tangential inlet 16 causes a vortex action in the soap box indicated in Fig. 2 which thoroughly washes the side walls of the box. The outlet from the soap box consists of a horizontal pipe 18 projecting beyond the soap box a sufficient distance so that dry soap particles will not flow out of the box due to their natural angle of repose indicated by the dotted line 19. Because of this arrangement there is no need for a valve or closure for the pipe 18. This structure is specifically disclosed and claimed in my co-pending application S. N. 623,991 filed October 23, 1945 for "Powdered Soap Dispenser for Clothes Washing Machines" and assigned to the assignee of the present application. The temperature of the water supplied for washing is adjusted by a switch member 20 which is adjustable to cause during washing, as hereinafter described, the completion of circuits either to the solenoid valve 12 or to both the solenoid valves 11 and 12 resulting in the supply of hot or intermediate temperature water. The circuit through the valve 12 is completed only when water is to be supplied for the washing operation so that only during this operation is hot water supplied to the soap box. The temperature adjusting switch 20 may be preset before the machine is started. Soap may accordingly be placed in the box before the machine is started and the soap will be flushed out of the box at the proper time. This feature is of particular advantage in washing machines having a control for causing the entire series of washing operations to be automatically performed in timed sequence, such as that disclosed and claimed in my previously mentioned application S. N. 551,096. The soap particles placed in the soap box are flushed out of the box without any substantial dissolving of the soap in the water. The soap particles are dissolved in the water while passing through the circulating pump so that the soap is substantially wholly in solution before it reaches the spinner basket. Undissolved fragments are caught by the filter 10, further insuring the purity of the washing solution.

The operation of the machine is best explained in connection with the fragmentary control diagram of Fig. 3 in which is illustrated a control member 21 which is diagrammatically illustrated as movable (manually or automatically by a suitable proposed control) to a control position for a washing operation during which water conditioning compound is to be added and to a plurality of other positions during which other operations are effected. These other operations may, for example, include soaking, rinsing, centrifugal drying, and emptying. In the washing position the control member closes a circuit across the power supply 22 through switch 22a to the circulating pump motor 7 and also closes a circuit through temperature adjusting switch 20, switches 22b, 22c, solenoid valves 11 and 12, and the float switch 14. Water is supplied under the control of the float switch, and, since the valve 12 is always energized in this position, hot water is tangentially discharged through the nozzle 16 into the soap box 17, setting up a vortex action indicated by dotted lines 23 which flushes the dry particles of soap or other water conditioning compound out of the soap box ordinarily within an interval of a few seconds. The vortex action results in a thorough scouring of the side walls of the soap box so the soap box is thoroughly clean after each use. This is an important feature since any wetted soap particles remaining in the soap box tend to dry and form a cake. In the other positions of the control member 21 the circuit through the switch 22b is open so that the solenoid valve 12 is deenergized. In some of the other positions of the control member 21 the circuit through contacts 24 is closed to energize the solenoid valve 11 to supply tepid water to the machine under the control of the float switch, and in these positions the circuit to the circulating pump motor may also be closed. One or more washing operations during which non-treated tepid water is supplied to the machine may precede the washing operation in which soap is to be added. Instead of soap for the washing operation it is obvious that a water softener, treating agent, or bluing may be added to the soap box and supplied to the machine by directing water through the box at the proper time.

Because of the great variety of washing operation, only that part of the control necessary for an understanding of the present invention has been illustrated.

What I claim as new and desire to secure by Letters Patent of the United States, is:

1. In a washing machine, a tub, a spinner basket constructed to hold water and clothes to be washed and centrifugally dried, a soap box for receiving dry particles of soap or other water conditioning compound, said box having a water supply inlet and a discharge to the tub, means for supplying water to said inlet, and a pump for pumping water from the tub to the spinner basket whereby the particles and water are mixed in the pump before reaching the spinner basket.

2. In a washing machine, a tub, a spinner basket constructed to hold the water and clothes to be washed and centrifugally dried, a soap box for receiving dry particles of soap or other water conditioning compound, said box having a water supply inlet and a discharge to the tub, electrically operated valve means in said water supply inlet, an electrical circuit for connecting said valve means to a source of electrical energy, switch means in said valve vircuit and responsive to the volume of water in said tub for controlling said electrically operated valve means, and a pump having an inlet communicating with said tub and discharging into said basket for pumping water from the tub to the spinner basket.

3. In a washing machine having a water receiving tub, a water supply system comprising a first and second thermostatically controlled valve respectively to supply tepid water and hot water to said tub, electrical means for operating each said valve to open position, a main electrical circuit and branch circuits therefrom for connecting each said operating means to a source of electrical energy, switch means serially connected in said main circuit and having an actuator responsive to the liquid level in said tub for closing and opening said circuit respectively at predetermined low and high liquid level conditions, switch means having contacts in series in each of said electrical valve operating branch circuits, actuating means common to said last-named contacts for conjointly operating the same to effect selective closure of either said first or second valve branch circuits, an auxiliary energizing circuit for said first valve operating means, said circuit including switch contacts operable by said common actuating means upon movement thereof to the hot water valve opening position to condition said auxiliary circuit for opening said tepid water valve, switch means in said auxiliary circuit for connecting said auxiliary circuit to said source of electrical energy, whereby a circuit condition may optionally be established energizing the first valve operating means conjointly with said second valve operating means to open said valves, a substantially cylindrical receiver for a charge of dry particles of soap or other water conditioning compound, a conduit communicating between said receiver and said tub to discharge thereinto above the maximum water level thereof, the length of said conduit being such that it will extend outwardly beyond the base of said charge of dry compound as represented by the normal angle of repose thereof, a conduit from said hot water valve discharging tangentially into said receiver above said communicating conduit, and a conduit from said tepid water valve discharging directly into said tub.

4. In a water supply system for a washing machine having a water receiving tub, means for supplying water to said tub including a first electrically operated valve for supplying tepid water and a second electrically operated valve for supplying hot water, an electrical circuit individual to each said valve operating means for connecting the same to a source of electrical energy, each said circuit including switch contact means, switch means in serial relation with each said valve operating circuit, a float disposed in said tub for closing and opening said switch means respectively at predetermined low and high liquid level conditions, actuating means common to the switch contact means in said individual valve energizing circuits for closing one or the other of said valve energizing circuits, a second circuit for energizing said first valve operating means, including switch contact means operated by said common actuating means for closure conjointly with closure of said hot water valve circuit contacts, and switch means in said second circuit whereby upon selective operation of said common actuating means and said last-named switch the respective valves may optionally be operated to supply tepid water, hot water or a mixture of tepid and hot water to said tub, subject to the operating status of said first-named switch means.

THOMAS T. WOODSON.

REFERENCES CITED

The following references are of record in the file of this patent:

UNITED STATES PATENTS

| Number | Name | Date |
| --- | --- | --- |
| 1,717,724 | McEvan | June 18, 1928 |
| 2,038,260 | Ash | Apr. 21, 1936 |
| 2,062,704 | Forsyth | Dec. 1, 1936 |
| 2,110,952 | Glenn | Mar. 15, 1938 |
| 2,155,254 | Clark | Apr. 18, 1939 |
| 2,228,914 | Pierce | Jan. 14, 1941 |
| 2,266,205 | Hunter | Dec. 16, 1941 |
| 2,267,351 | Gohl | Dec. 23, 1941 |
| 2,323,993 | Harvey | July 13, 1943 |
| 2,350,218 | De Remer | May 30, 1944 |
| 2,355,455 | McPhilomy | Aug. 8, 1944 |
| 2,372,770 | De Remer | Apr. 3, 1945 |